(12) United States Patent
Fukuzawa

(10) Patent No.: US 8,662,537 B2
(45) Date of Patent: Mar. 4, 2014

(54) SEAT BELT DEVICE

(75) Inventor: Masaki Fukuzawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/512,176

(22) PCT Filed: Dec. 28, 2010

(86) PCT No.: PCT/JP2010/073808
§ 371 (c)(1),
(2), (4) Date: May 25, 2012

(87) PCT Pub. No.: WO2012/090329
PCT Pub. Date: Jul. 5, 2012

(65) Prior Publication Data
US 2013/0264859 A1  Oct. 10, 2013

(51) Int. Cl.
*B60R 22/28* (2006.01)
*B60R 22/12* (2006.01)

(52) U.S. Cl.
USPC .......................................... 280/805; 297/470

(58) Field of Classification Search
USPC .................................. 297/470–472; 280/805
IPC .............................................. B60R 22/28,22/12
See application file for complete search history.

(56) References Cited

U.S. PATENT DOCUMENTS

| | | | | |
|---|---|---|---|---|
| 4,054,952 | A * | 10/1977 | Swallow | 2/338 |
| 5,712,011 | A * | 1/1998 | McMahon et al. | 428/36.9 |
| 6,260,926 | B1 * | 7/2001 | Meraw | 297/468 |
| 7,264,276 | B2 * | 9/2007 | Blackburn | 280/805 |
| 2004/0171321 | A1 | 9/2004 | Plant | |
| 2008/0172779 | A1 * | 7/2008 | Ferguson | 2/455 |
| 2009/0305589 | A1 * | 12/2009 | Budden et al. | 442/59 |

FOREIGN PATENT DOCUMENTS

| | | |
|---|---|---|
| JP | A-7-190694 | 7/1995 |
| JP | U-3051235 | 8/1998 |
| JP | A-11-129864 | 5/1999 |
| JP | A-2001-163179 | 6/2001 |
| JP | A-2005-1454 | 1/2005 |
| JP | A-2005-514222 | 5/2005 |
| JP | A-2006-290053 | 10/2006 |
| JP | A-2007-512164 | 5/2007 |
| JP | A-2007-196881 | 8/2007 |
| JP | A-2007-223409 | 9/2007 |
| JP | A-2010-913 | 1/2010 |
| JP | A-2011-020491 | 2/2011 |

* cited by examiner

OTHER PUBLICATIONS

International Search Report issued in International Patent Application No. PCT/JP2010/073808 dated Feb. 1, 2011 (with translation).

*Primary Examiner* — Ruth Ilan
(74) *Attorney, Agent, or Firm* — Oliff PLC

(57) ABSTRACT

A dilatant characteristic portion, that is structured to include a dilatant characteristic resin material, is provided at a portion of a webbing from a lap webbing portion to a portion that is further toward a shoulder webbing side than a through-hole of a tongue in a webbing applied state. When the webbing is pushed against an inner peripheral portion of the through-hole due to a body of a passenger pulling the webbing when a vehicle suddenly decelerates, the dilatant characteristic resin material hardens due to this load. Due thereto, flexure of the webbing when the webbing attempts to pass-through the through-hole and move is restricted, and therefore, the shoulder webbing passing-through the through-hole and moving toward a waist portion side of the passenger can be prevented or suppressed.

9 Claims, 8 Drawing Sheets

SEAT BELT DEVICE

TECHNICAL FIELD

The present invention relates to a seat belt device that, by a webbing, restrains the body of a passenger who is seated in a seat.

BACKGROUND ART

In the seat belt device disclosed in following Patent Document 1, when a passenger applies a webbing to himself/herself, a buckle driving device is activated, and moves a buckle device toward a transverse direction outer side of the seat. Due thereto, the slack at the shoulder webbing, that restrains the chest portion and the shoulder portion of the passenger further toward the longitudinal direction proximal end side of the webbing than the tongue, is reduced.

Patent Document 1: Japanese Patent Application Laid-Open No. 2007-196881

DISCLOSURE OF INVENTION

Technical Problem

By the way, when the vehicle suddenly decelerates, the body of the passenger attempts to inertially move toward the vehicle front side, and due thereto, the webbing is pulled by the body of the passenger. Due thereto, when the shoulder webbing passes-through the through-hole of the tongue and moves toward the lap (waist portion) side, the waist portion of the passenger inertially moves toward the vehicle front, and the tension of the shoulder webbing, and the tension of the portion in the vicinity of the tongue at the shoulder webbing in particular, increases. Thus, it has been thought to, when the webbing is pulled by the body of the passenger, lock the webbing at the tongue and prevent the shoulder webbing from moving toward the lap side.

However, when the body of the passenger pulls the webbing in a state in which the webbing is locked by the tongue, at the webbing, a large load concentrates at the portion that is locked by the tongue. Therefore, the strength of the webbing must be increased so as to be able to withstand such load.

In view of the above-described circumstances, an object of the present invention is to obtain a seat belt device that, without particularly increasing the strength of a webbing, can prevent or suppress movement of the webbing from the shoulder side toward the lap side when the webbing is pulled.

Solution to Problem

A seat belt device according to a first embodiment has: a webbing whose longitudinal direction intermediate portion passes-through a through-hole formed in a tongue, and at which the tongue is provided so as to be moveable in the longitudinal direction, and at which, in an applied state to a body of a passenger, further toward one longitudinal direction end side than the through-hole, the webbing is a lap webbing that restrains a waist portion of the passenger, and, further toward the other longitudinal direction end side than the through-hole, the webbing is a shoulder webbing that restrains a chest portion and a shoulder portion of the passenger; and a dilatant characteristic portion that is provided at a region of the webbing, which region includes a portion that is positioned at an inner side of the through-hole in the applied state, and that is structured to include a material having a dilatant characteristic of hardening due to load of a predetermined magnitude or greater being applied.

In the seat belt device according to the first embodiment, the webbing is placed around the body of the passenger, and, in this state, when the tongue that is provided at the webbing is inserted into the buckle, there becomes an applied state of the webbing to the body of the passenger. In this applied state, among the webbing, the portion, that is further toward one longitudinal direction end side than the through-hole of the tongue, is a lap webbing and restrains the waist portion of the passenger, and the portion, that is further toward the other longitudinal direction end side than the through-hole of the tongue, is a shoulder webbing and restrains the chest portion and the shoulder portion of the passenger.

On the other hand, in the seat belt device relating to the present invention, the dilatant characteristic portion is provided at the webbing. The dilatant characteristic portion is positioned at a region of the webbing, which region includes the portion that is, in the above-described applied state, positioned at the inner side of the through-hole formed in the tongue. For example, when the body of the passenger attempts to move inertially toward the vehicle front side due to the vehicle suddenly decelerating, the lap webbing is pulled toward one longitudinal direction end side thereof (i.e., the side opposite the tongue) by the waist portion of the passenger, and the shoulder webbing is pulled toward the other longitudinal direction end side thereof (i.e., the side opposite the tongue) by the chest portion and the like of the passenger.

Due to the webbing being pulled in this way, at the webbing, the portion that is positioned at the inner side of the through-hole of the tongue is pushed-against the inner peripheral portion of the through-hole, and receives pushing reaction force from the inner peripheral portion of the through-hole. The dilatant characteristic portion that is provided at the webbing is structured to include a material that has the dilatant characteristic of hardening due to load of a predetermined magnitude or greater being applied. Therefore, when the dilatant characteristic portion receives the pressing reaction force from the inner peripheral portion of the through-hole, the dilatant characteristic portion hardens. Due thereto, flexure of at least the portion at the webbing, which portion is positioned at the inner side of the through-hole, and the vicinity thereof, is restricted by the dilatant characteristic portion that has hardened, and the shoulder webbing passing-through the through-hole of the tongue and moving toward the waist portion side of the passenger can be prevented or suppressed.

Furthermore, when the webbing is pulled as described above, the webbing is supported by the dilatant characteristic portion at which the portion that passes-through the through-hole of the tongue, and the vicinity thereof, have hardened. Therefore, even if the strength of the webbing itself is not increased in particular, the webbing can withstand the pushing reaction force (i.e., the load) from the inner peripheral portion of the through-hole.

In a seat belt device according to a second embodiment, in the state in which the webbing is applied to the body of the passenger, the dilatant characteristic portion is provided to a region that is further toward the lap webbing side than the through-hole.

In the seat belt device according to a second embodiment, in the state in which the webbing is applied to the body of the passenger, the dilatant characteristic portion is positioned to further toward the lap webbing side than the through-hole of the tongue. Therefore, at the lap webbing, the thickness increases by an amount corresponding to the amount by which the dilatant characteristic portion is provided. By increasing the thickness of the lap webbing in this way, looseness, or so-called "slack", of the lap webbing in the state in which the passenger has applied the webbing can be reduced.

In a seat belt device according to a third embodiment, in the state in which the webbing is applied to the body of the passenger, the dilatant characteristic portion is provided at a region that passes further toward the shoulder webbing side than the through-hole, and to a portion in a vicinity of the through-hole.

In the seat belt device according to the third embodiment, in the state in which the webbing is applied to the body of the passenger, the dilatant characteristic portion is positioned to the vicinity of the through-hole, at the portion that is further toward the shoulder webbing side than the through-hole of the tongue. Therefore, because the dilatant characteristic portion is not provided at the majority of the shoulder webbing, bulging or the like due to the provision of the dilatant characteristic portion does not arise at the majority of the shoulder webbing, and the majority of the shoulder webbing is a simple strip shape. Due thereto, the applied sensation that the passenger feels when the passenger has applied the webbing improves, and the appearance also improves.

Moreover, in the state in which the webbing is applied to the body of the passenger, the dilatant characteristic portion does not protrude greatly toward the shoulder webbing side, and therefore, the cost as well is inexpensive.

In a seat belt device according to a fourth embodiment, in a state in which the webbing is folded-over at one end side of the webbing, and the dilatant characteristic portion is disposed between a portion of the webbing that is further toward the other end side than the folded-over position and a portion of the webbing that is further toward the one end side than the folded-over position, the portion of the webbing that is further toward the other end side than the folded-over position and the portion of the webbing that is further toward the one end side than the folded-over position are superposed, and a periphery of the dilatant characteristic portion at the webbing is sewn.

In the seat belt device according to the fourth embodiment, the webbing is folded-over at one end side of the webbing, and the dilatant characteristic portion is disposed between a portion of the webbing that is further toward the other end side than this folded-over position and a portion of the webbing that is further toward the one end side than this folded-over position. In this state, the portions of the webbing that are further toward the other end side and the one end side than the folded-over position are superposed, and the superposed portions of the webbing at the one end side and the other end side are sewn at the periphery of the dilatant characteristic portion. Due thereto, the dilatant characteristic portion is provided at the webbing.

In a seat belt device according to a fifth embodiment, the webbing is formed in a bag shape that is open at one end thereof, and, in a state in which the dilatant characteristic portion is inserted into an inner side of the webbing from the opening, a portion of the webbing that is further toward one end side than the dilatant characteristic portion is sewn.

In accordance with the seat belt device according to the fifth embodiment, the webbing is formed in a bag shape that is open at one end thereof, and the dilatant characteristic portion is inserted into an inner side of the webbing from this opening. In the state in which the dilatant characteristic portion is accommodated at the inner side of the webbing, the webbing is sewn so as to close the opening at the one end of the webbing. Due thereto, the dilatant characteristic portion is provided at the webbing.

In a seat belt device according to a sixth embodiment, the dilatant characteristic portion is integrally attached to one surface in a thickness direction of the webbing.

In accordance with the seat belt device according to the sixth embodiment, the dilatant characteristic portion is integrally attached to one surface in a thickness direction of the webbing, by sewing or adhesion or the like. Due thereto, the dilatant characteristic portion is provided at the webbing.

In a seat belt device according to a seventh embodiment, a transverse dimension of the dilatant characteristic portion along a transverse direction of the webbing is set to be shorter than a transverse dimension of the webbing, and the dilatant characteristic portion is provided at one side in a thickness direction of the webbing, and a cut-out portion, through whose inner side the dilatant characteristic portion passes, is formed in the tongue so as to communicate with the through-hole.

In accordance with the seat belt device according to the seventh embodiment, the transverse direction of the dilatant characteristic portion runs along the transverse direction of the webbing, and furthermore, the transverse dimension thereof is set to be shorter than the transverse dimension of the webbing, and the dilatant characteristic portion is provided at one side in the thickness direction of the webbing.

On the other hand, the through-hole, through which the webbing passes, is formed in the tongue, and further, a cut-out portion is formed in the tongue so as to communicate with the through-hole. When the webbing passes-through the through-hole, the dilatant characteristic portion passes-through this cut-out portion. By providing the dilatant characteristic portion at one side in the thickness direction of the webbing in this way, even though the thickness of the overall webbing that includes the dilatant characteristic portion increases, due to the dilatant characteristic portion passing-through the above-described cut-out portion, the webbing can move relatively smoothly from the shoulder webbing side toward the lap webbing side, or from the lap webbing side toward the shoulder webbing side.

In a seat belt device according to an eighth embodiment, the dilatant characteristic portion is formed by a dilatant material, that has a dilatant characteristic of hardening by receiving load, covering a covering portion that is more flexible than a main dilatant characteristic portion in a hardened state.

In accordance with the seat belt device according to the eighth embodiment, the dilatant material, that has a dilatant characteristic, is covered by the covering portion that is more flexible than the dilatant material that has hardened. Therefore, even when the dilatant material receives load and hardens, the flexible covering portion is interposed between this hardened dilatant material and the body of the passenger, and therefore, it is difficult for the hardness of the hardened dilatant material to be transmitted to the body of the passenger.

In a seat belt device according to a ninth embodiment, a taper shape, at which a transverse dimension of the dilatant characteristic portion along a transverse direction of the webbing gradually becomes shorter, is formed from an intermediate portion of the dilatant characteristic portion along a longitudinal direction of the webbing, toward at least one of one end and the other end, and a cut-out portion, through which passes a portion of the webbing at which portion a thickness dimension is increased due to provision of the dilatant characteristic portion, is formed in the tongue so as to communicate with the through-hole.

In the seat belt device according to the ninth embodiment, the thickness dimension increases at the portion of the webbing at which the dilatant characteristic portion is provided.

The cut-out portion, that communicates with the through-hole, is formed in the tongue so as to correspond to the portion of the webbing, at which portion the thickness dimension is increased in this way. Due to a section of a portion at the webbing, at which portion the thickness dimension is increased due to the provision of the dilatant characteristic portion, passing-through the cut-out portion, the portion of the webbing at which the thickness dimension is increased can move relatively smoothly from the shoulder webbing side toward the lap webbing side, or from the lap webbing side toward the shoulder webbing side.

Here, in the seat belt device relating to the present invention, a taper shape, at which a transverse dimension of the dilatant characteristic portion along a transverse direction of the webbing gradually becomes shorter, is formed from an intermediate portion of the dilatant characteristic portion along a longitudinal direction of the webbing, toward at least one of one end and the other end. Therefore, at the webbing, when the portion at which the dilatant characteristic portion is provided passes-through the above-described cut-out portion, the portion at which the dilatant characteristic portion is provided passes-through from one longitudinal direction end or the other end, at which the transverse dimension is sufficiently shorter than the opening width of the cut-out portion, of the dilatant characteristic portion.

Due thereto, when the tongue is moved from the state in which the tongue is positioned further toward the outer side than the portion at which the dilatant characteristic portion is provided along the longitudinal direction of the webbing, toward the side of the portion at which the dilatant characteristic portion is provided, the portion at which the dilatant characteristic portion is provided can be smoothly inserted-into and passed-through the above-described cut-out portion.

Note that the "intermediate portion" in the "intermediate portion of the dilatant characteristic portion along the longitudinal direction of the webbing" means the portion further toward the longitudinal direction inner side than the both ends of the dilatant characteristic portion along the longitudinal direction of the webbing, and is not limited to the central portion of the dilatant characteristic portion along the longitudinal direction of the webbing.

Advantageous Effects of Invention

As described above, in the seat belt device according to the first embodiment, flexure of the portion of the webbing, which portion is positioned at the inner side of the through-hole of the tongue, and the vicinity thereof, can be restricted by the dilatant characteristic portion that has hardened, and the shoulder webbing passing-through the through-hole of the tongue and moving toward the waist portion side of the passenger can be prevented or suppressed. Moreover, because the webbing is supported by the dilatant characteristic portion that has hardened, even if the strength of the webbing itself is not increased in particular, the webbing can withstand the pushing reaction force (i.e., the load) from the inner peripheral portion of the through-hole.

In the seat belt device according to the second embodiment, because the thickness of the lap webbing increases by an amount corresponding to the amount by which the dilatant characteristic portion is provided, looseness, or so-called "slack", of the lap webbing can be reduced.

In the seat belt device according to the third embodiment, the applied sensation that the passenger feels when the passenger has applied the webbing improves, and the appearance also is good, and the cost as well is inexpensive.

In the seat belt devices according to the fourth and fifth embodiments, the dilatant characteristic portion can be provided integrally with the webbing, in a state in which the dilatant characteristic portion is provided at the inner side of the webbing.

In the seat belt device according to the sixth embodiment, the dilatant characteristic portion can be provided integrally at one surface in the thickness direction of the webbing.

In the seat belt device according to the seventh embodiment, even though the thickness of the webbing overall increases due to the provision of the dilatant characteristic portion, the webbing can move relatively smoothly from the shoulder webbing side toward the lap webbing side, or from the lap webbing side toward the shoulder webbing side.

In the seat belt device according to an eighth embodiment, it is difficult for the hardness of the hardened dilatant material to be transmitted to the body of the passenger.

In the seat belt device according to ninth embodiment, the portion of the webbing, at which portion the dilatant characteristic portion is provided, easily enters into the cut-out portion of the tongue.

BEST MODES FOR CARRYING OUT THE INVENTION

An embodiment of the present invention is described next on the basis of the respective drawings of FIG. 1 through FIG. 8.

<Structure of Present Embodiment>

Figure 1:
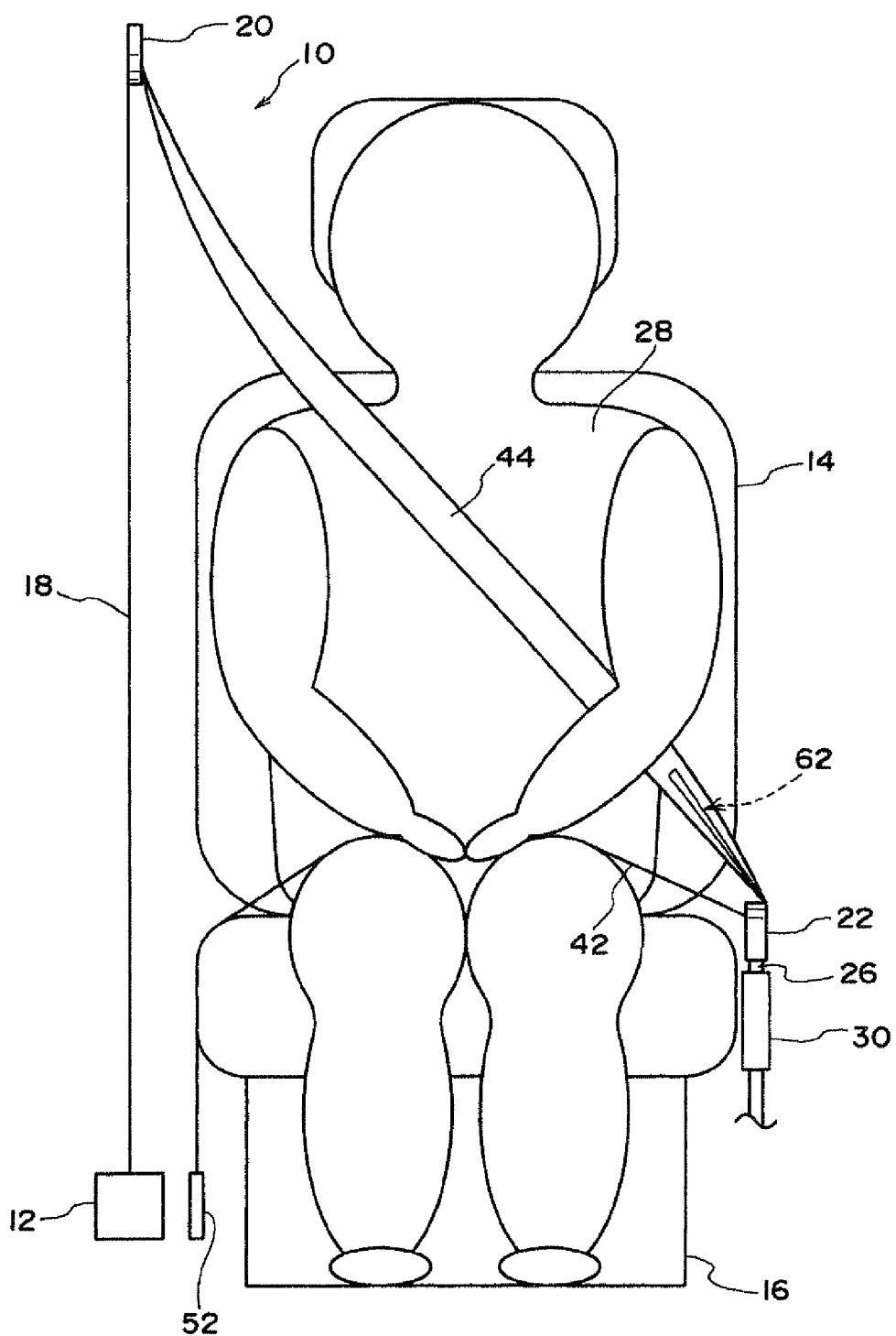
FIG. 1 is a front view, from the vehicle front, showing a summary of the overall structure of a seat belt device relating to an embodiment of the present invention.

The overall structure of a seat belt device 10 relating to the present embodiment is shown in FIG. 1 by a schematic front view.

As shown in this drawing, the present seat belt device 10 has a retractor 12. The retractor 12 is fixed, at a transverse direction side of a seat 14 that is set in the vehicle, to the vehicle body or a frame 16 of the seat 14 or the like (an unillustrated vehicle body in the present embodiment). A spool, whose axial direction runs along the vehicle front-back direction for example, is provided so as to rotate freely at this retractor 12, and the longitudinal direction proximal end portion of a webbing 18, that is formed in an elongated strip shape, is anchored on this spool.

The webbing 18 is stored in a state in which the longitudinal direction proximal end side thereof is taken-up in a layered form on the outer peripheral portion of the spool, and the distal end side thereof is pulled-out toward the upper side of the vehicle. Further, an unillustrated lock mechanism is provided at the retractor 12, and when the vehicle enters a state of sudden deceleration or the like, the spool is locked, and rotation of the spool at the time when the webbing 18 is pulled-out from the spool is restricted.

On the other hand, a shoulder anchor 20 is mounted to the vehicle body above the retractor 12. A slit hole, that passes-through approximately in the transverse direction of the vehicle, is formed in the shoulder anchor 20. The webbing 18, that is pulled-out upward from the spool of the retractor 12, passes-through the slit hole of the shoulder anchor 20, and is folded-over downward.

Figure 2:
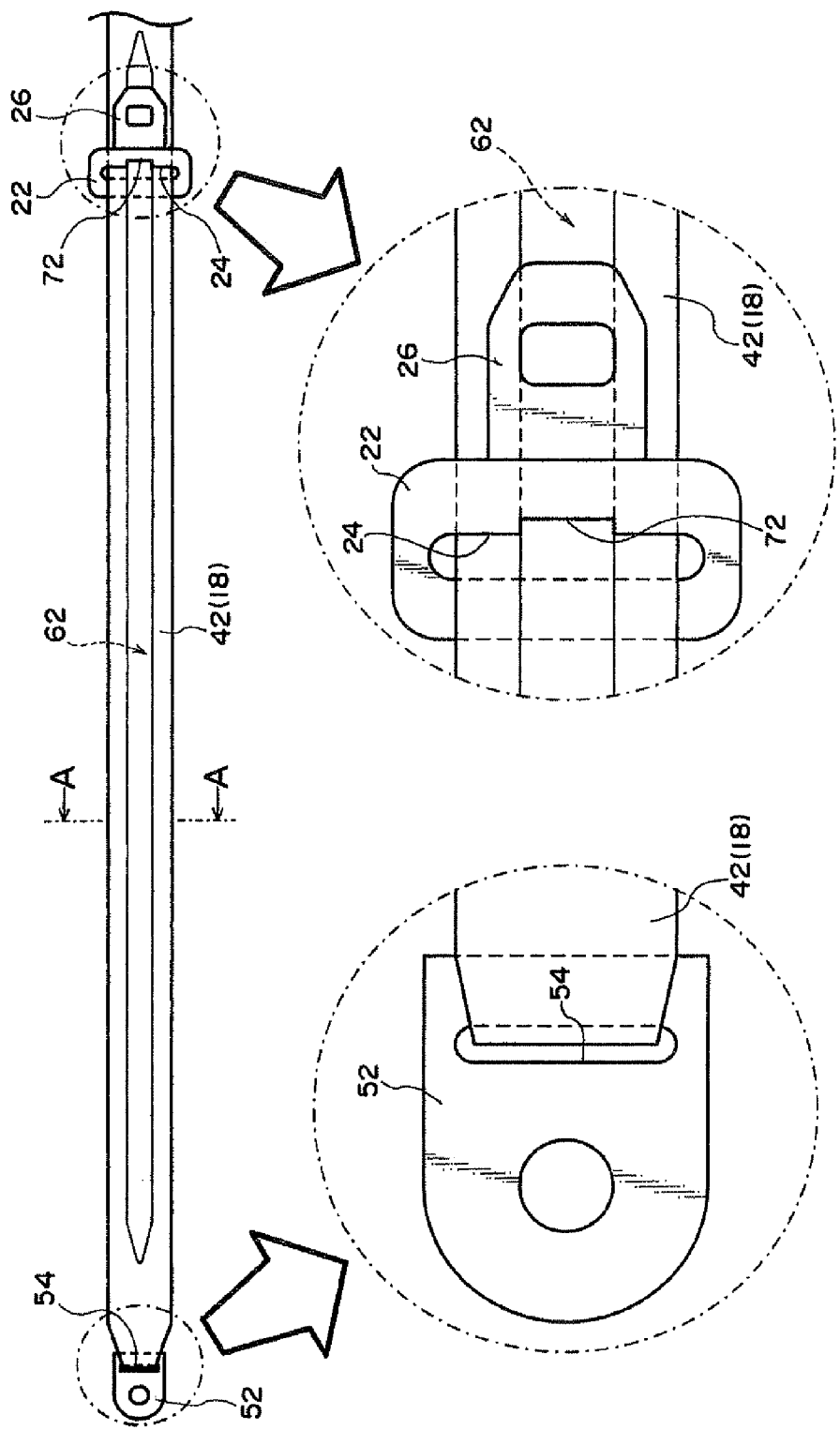
FIG. 2 is a plan view of a lap belt portion at a webbing.
Figure 4:
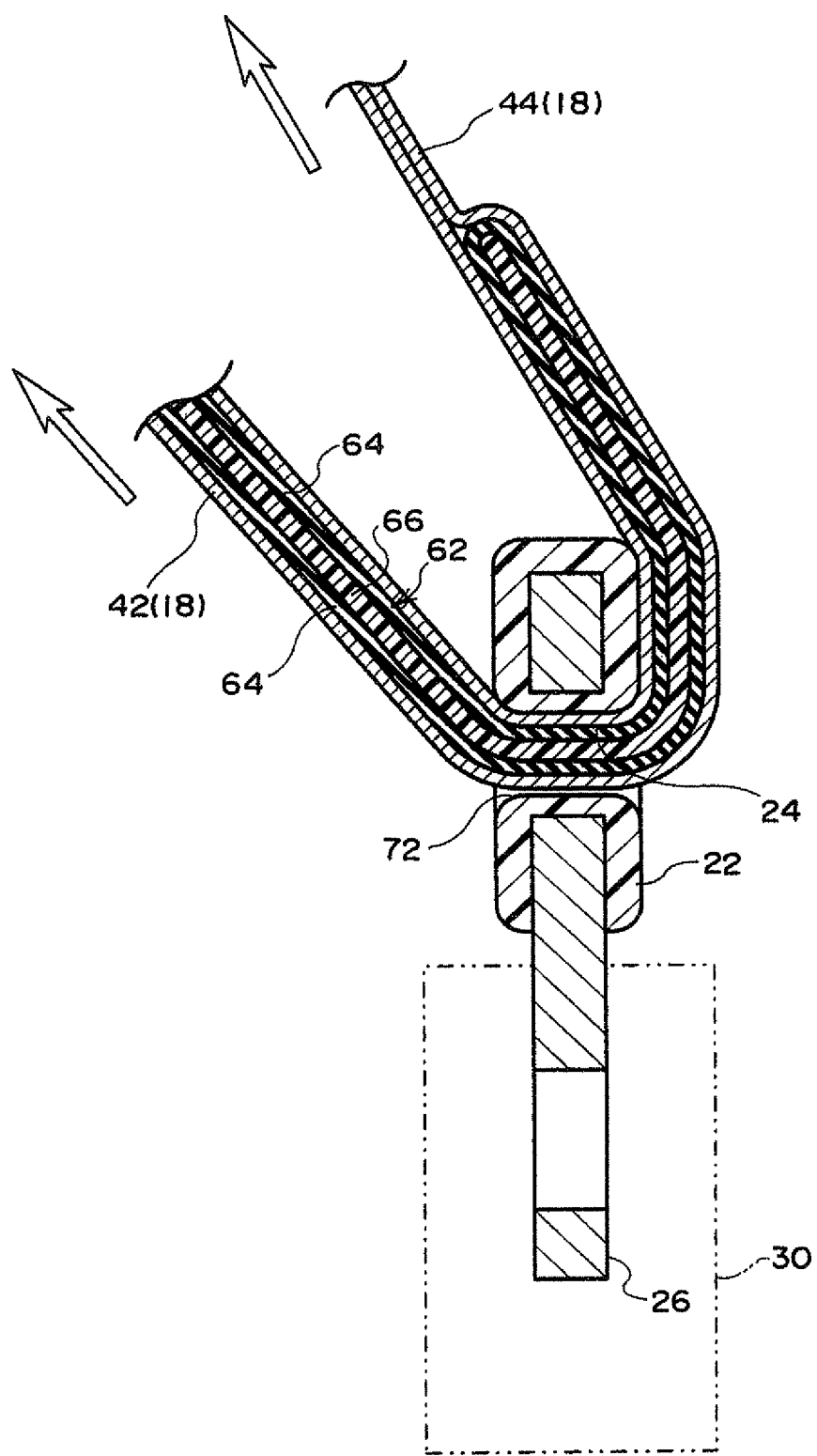
FIG. 4 is a cross-sectional view of a tongue and a vicinity thereof in an applied state of the webbing.

A tongue 22 is provided at the webbing 18, further toward the distal end side of the webbing 18 than the shoulder anchor 20. As shown in FIG. 2 and FIG. 4, the tongue 22 is formed, from a plate material made of metal, by a portion of a core metal being covered by a synthetic resin material. A through-hole 24, that passes-through in the thickness direction of the tongue 22, is formed in the tongue 22. This through-hole 24 is made to be the shape of a slit whose longitudinal direction runs along the transverse direction of the webbing 18, and the webbing 18 passes-through this through-hole 24.

Further, the portion, that projects out from the synthetic resin material at the core metal of the tongue 22, is an insert-in portion 26. When a passenger 28 who is seated in the seat 14 applies the webbing 18 to himself/herself, as shown in FIG. 1, in the state in which the webbing 18 is placed around the body of the passenger 28, the insert-in portion 26 of the tongue 22 is inserted into a buckle 30 that is provided at the side of the seat 14 opposite the retractor 12. The insert-in portion 26 holds the buckle 30. In this state, the portion at the webbing 18, which portion is further toward the distal end side than the through-hole 24 of the tongue 22, is a lap webbing 42 and restrains the waist portion of the passenger 28, and the portion at the webbing 18, which portion is further toward the proximal end side than the through-hole 24 of the tongue 22, is a shoulder webbing 44 and restrains the abdomen portion and the chest portion, the shoulder portion of the passenger 28.

Moreover, an anchor plate 52 is mounted to the vehicle body or the frame 16 of the seat 14 or the like (an unillustrated vehicle body in the present embodiment), at the side of the seat 14 at which the retractor 12 is provided. As shown in FIG. 2, a slit hole 54 is formed in the anchor plate 52. The webbing 18 passes-through the slit hole 54, and is folded-over toward the longitudinal direction proximal end side of the webbing 18 up to the portion that becomes the shoulder webbing 44 of the webbing 18, and the portions that are further toward the longitudinal direction proximal end side and distal end side of the webbing 18 than the folded-over position are overlapped on each other. A dilatant characteristic portion 62 is provided between the portions of webbing 18 that are overlapped in this way. The dilatant characteristic portion 62 is provided so as to be continuous via the through-hole 24 of the tongue 22 from the lap webbing 42 side of the webbing 18 toward the shoulder webbing 44 side, in the applied state in which the passenger 28 has inserted the insert-in portion 26 of the tongue 22 into the buckle 30 and has applied the webbing 18 to his/her body.

Figure 5:
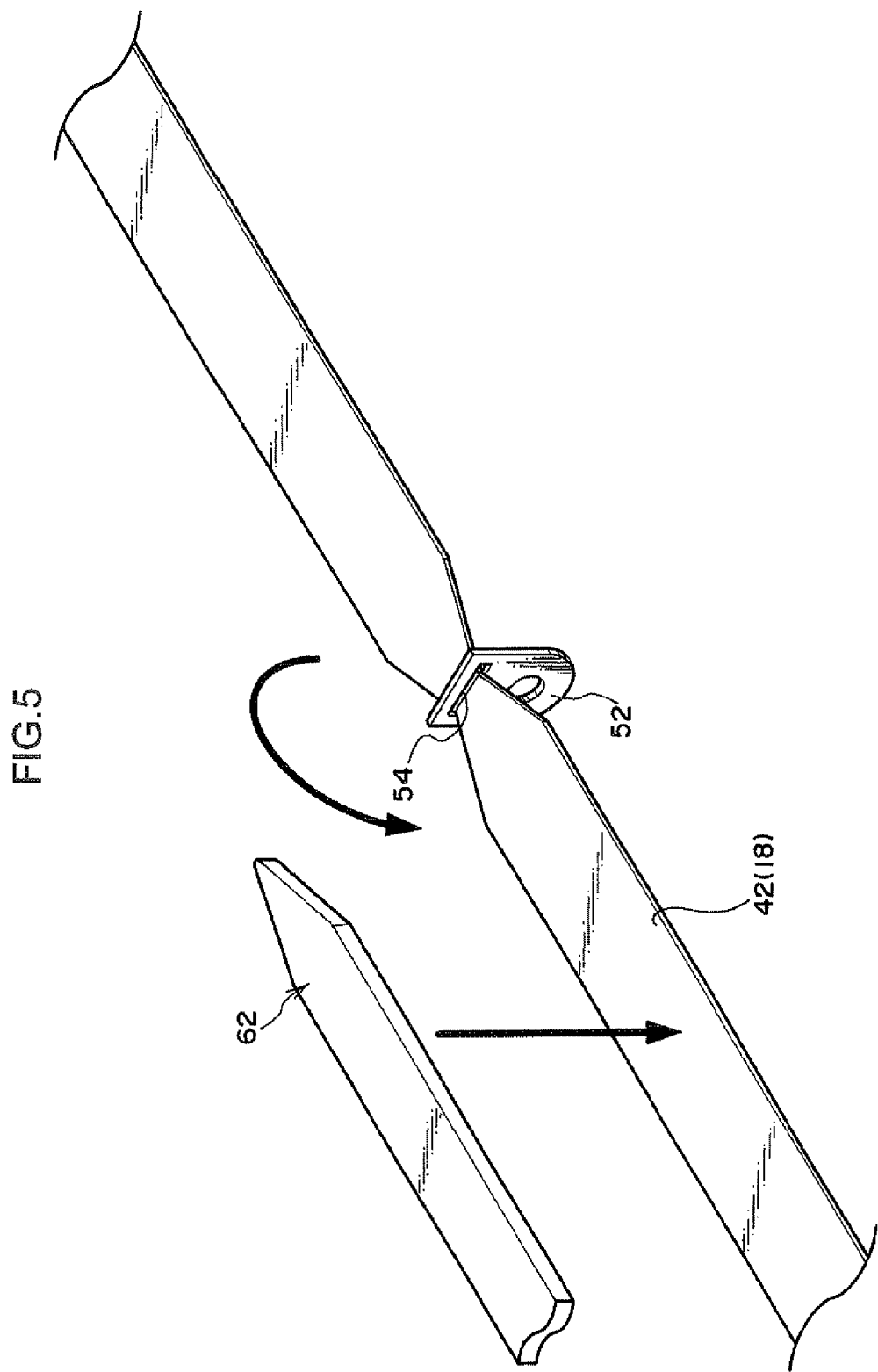
FIG. 5 is an exploded perspective view of the webbing, showing a state before a dilatant characteristic portion is provided at the webbing.

As shown in FIG. 5, the dilatant characteristic portion 62 is incorporated in the webbing 18 by, in the state in which the dilatant characteristic portion 62 is placed on the portion of the webbing 18 that is further toward the proximal end side (or the distal end side) than the folded-over position at the slit hole 54, the portion further toward the distal end side (or proximal end side) than the folded-over position at the slit hole 54 being made to cover the dilatant characteristic portion 62, and the webbing 18 being sewn such that the dilatant characteristic portion 62 is enclosed from the outer sides.

Figure 3:
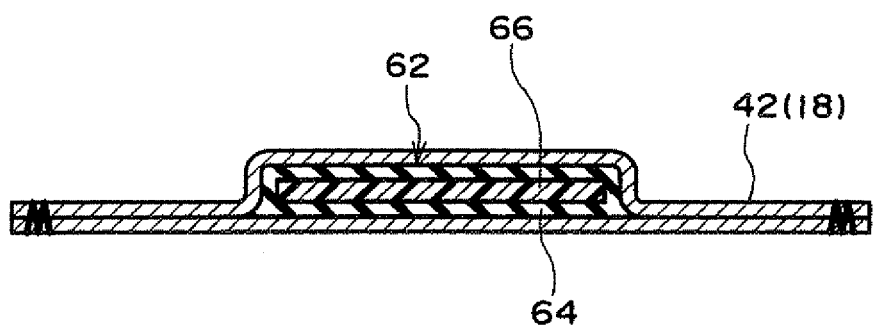
FIG. 3 is a cross-sectional view of the webbing along line A-A of FIG. 2.

As shown in FIG. 3, the dilatant characteristic portion 62 has a covering portion 64. The covering portion 64 is formed of, for example, a rubber material or a flexible synthetic resin material having elasticity of the extent of a rubber material. This covering portion 64 is formed in a hollow shape whose longitudinal direction runs along the longitudinal direction of the webbing 18. Further, from a predetermined position (a longitudinal direction intermediate portion) of a longitudinal direction one end side of the covering portion 64 to the one end portion, the covering portion 64 is formed in a taper shape whose transverse dimension gradually becomes shorter toward the one end side. Moreover, from a predetermined position (a longitudinal direction intermediate portion) of the longitudinal direction other end side of the covering portion 64 to the other end portion, the covering portion 64 is formed in a taper shape whose transverse dimension gradually becomes shorter toward the other end side. A dilatant characteristic resin 66 that serves as a dilatant characteristic material is provided at the inner side of this covering portion 64. The dilatant characteristic resin 66 has the characteristic of being in a liquid form or a gel form in a usual state, but instantaneously hardening due to load from the exterior being applied thereto.

In the state in which the webbing 18 is applied to the body of the passenger 28 shown in FIG. 1, the set range of the dilatant characteristic portion 62 at the webbing 18 is set such that a portion of the dilatant characteristic portion 62 is positioned within the through-hole 24, as shown in FIG. 4. Further, in the present embodiment, in the state in which the webbing 18 is applied to the body of the passenger 28, one end of the dilatant characteristic portion 62 (the end portion at the anchor plate 52 side) is sufficiently apart from the through-hole 24, and the dilatant characteristic portion 62 is set at the majority of the lap webbing 42. In contrast, in the present embodiment, the range of the dilatant characteristic portion 62 is set such that, in the state in which the webbing 18 is applied to the body of the passenger 28, the other end of the dilatant characteristic portion 62 (the end portion at the shoulder anchor 20 side) is positioned in a vicinity of the through-hole 24.

Note that the above-described set range of the dilatant characteristic portion 62 is strictly an example, and, in the state in which the webbing 18 is applied to the body of the passenger 28, the one end of the dilatant characteristic portion 62 may be positioned in a vicinity of the through-hole 24, and the other end of the dilatant characteristic portion 62 may be set such that the dilatant characteristic portion 62 is positioned at the majority of the shoulder webbing 44.

Within the range of the webbing 18 at which the dilatant characteristic portion 62 is provided, the thickness of the webbing 18 increases by the amount by which the dilatant characteristic portion 62 is provided, and the cross-sectional shape of the webbing 18 is a convex shape in which the portion where the dilatant characteristic portion 62 is disposed bulges toward one side in the thickness direction of the webbing 18 (the side at which the dilatant characteristic portion 62 is provided). Moreover, because the both longitudinal direction end sides of the covering portion 64 are formed in taper shapes whose transverse dimensions gradually become shorter as described above, the bulging at the portion where the dilatant characteristic portion 62 is disposed also is, at the both longitudinal direction end sides thereof, shaped as tapers whose transverse dimensions gradually become shorter. The bulge of the webbing 18 due to the provision of the dilatant characteristic portion 62 in this way is, in the present embodiment, positioned at the side of the body of the passenger 28 at the lap webbing 42 side, and is positioned at the side opposite the side of the body of the passenger 28 at the shoulder webbing 44 side.

As shown in FIG. 2, a cut-out portion 72 is formed in the tongue 22 so as to correspond to the cross-sectional shape of the webbing 18 at the position at which the dilatant characteristic portion 62 is provided. The cut-out portion 72 is a substantially rectangular cut-out that opens at the inner peripheral portion of the through-hole 24, and the portion at the webbing 18, which portion bulges due to the provision of the dilatant characteristic portion 62, passes-through the inner side of the cut-out portion 72.

<Operation, Effects of Present Embodiment>

The operation and effects of the present embodiment are described next.

When the passenger 28 who is seated in the seat 14 applies the webbing 18, first, the passenger 28 grasps the tongue 22 and pulls the webbing 18 toward the buckle 30 side. Due thereto, the webbing 18, that is taken-up on the spool of the retractor 12, is pulled-out. The portion of the pulled-out webbing 18 between the anchor plate 52 and the shoulder anchor 20 is placed around the front of the body of the passenger 28. In this state, due to the insert-in portion 26 of the tongue 22 being inserted into the buckle 30 and the tongue 22 being held at the buckle 30, there becomes an applied state of the webbing 18 with respect to the body of the passenger 28.

By the way, although the webbing 18 passes-through the through-hole 24 that is formed in the tongue 22, due to the passenger 28 grasping the tongue 22 and pulling the webbing 18, the portion of the webbing 18, at which portion the dilatant characteristic portion 62 is provided, reaches the tongue 22. As described above, at the portion of the webbing 18 at which portion the dilatant characteristic portion 62 is provided, the transverse direction intermediate portion of the webbing 18 at one side in the thickness direction of the webbing 18 is thicker than the other regions of the webbing 18. Here, in the seat belt device 10 relating to the present embodiment, the cut-out portion 72 is formed in the tongue 22 so as to correspond to the portion of the webbing 18, at which portion the thickness is increased due to the provision of the dilatant characteristic portion 62 in this way, and the portion of increased thickness of the webbing 18 passes-through this cut-out portion 72. Therefore, even though the thickness of the webbing 18 increases locally by providing the dilatant characteristic portion 62 at the webbing 18, the webbing 18 can pass-through the tongue 22.

Moreover, because the both longitudinal direction end sides of the dilatant characteristic portion 62 are formed in the shapes of tapers whose transverse dimensions gradually become shorter toward the transverse direction outer sides (toward the both transverse direction end sides), the portion of the webbing 18, at which portion the thickness has increased due to the provision of the dilatant characteristic portion 62, also is, in vicinities of the both longitudinal direction end portions thereof, the shape of a taper whose transverse dimension gradually becomes shorter. Therefore, when the portion at the webbing 18, at which portion the dilatant characteristic portion 62 is provided, is inserted into the cut-out portion 72, the both transverse direction ends of the portion of the webbing 18 where the thickness is increased are positioned further toward the inner side than the both transverse direction ends of the cut-out portion 72. When the portion of the webbing 18 where the thickness is increased is inserted into the cut-out portion 72, the longitudinal direction end portions of the portion of the webbing 18 where the thickness is increased smoothly enter into the cut-out portion 72 and can pass-through the cut-out portion 72, without interfering with the both transverse direction ends of the cut-out portion 72.

Note that, in the present embodiment, the both longitudinal direction end sides of the dilatant characteristic portion 62 are made into taper shapes such as described above, but there may be a structure in which only either one of a longitudinal direction one end side and other end side of the dilatant characteristic portion 62 is formed in a taper shape. Further, in the present embodiment, taper shapes, at which the transverse dimension gradually becomes shorter, are formed at the longitudinal direction one end side and other end side of the dilatant characteristic portion 62. In addition to such a structure, for example, the dilatant characteristic portion 62 may be structured such that the dilatant characteristic portion 62 gradually becomes thinner further toward end portion sides than the longitudinal direction intermediate portion of the dilatant characteristic portion 62, and due thereto, even the portion at the webbing 18, at which portion the thickness is increased due to the provision of the dilatant characteristic portion 62, is structured such that the increase in the thickness dimension becomes the smallest at the end portion sides. In the case of such a structure as well, the longitudinal direction end portions of the portion of the webbing 18 where the thickness is increased smoothly enter into the cut-out portion 72 and can pass-through the cut-out portion 72, without interfering with the cut-out portion 72.

In this state, as described above, the portion of the webbing 18 further toward the distal end side (the anchor plate side 52) than the portion positioned at the inner side of the through-hole 24 of the tongue 22 is the lap webbing 42, and restrains the waist portion of the passenger 28 from the vehicle front side. In contrast, the portion of the webbing 18 between the shoulder anchor 20 and the portion positioned at the inner side of the through-hole 24 of the tongue 22 is the shoulder webbing 44 that restrains, from the vehicle front, the region from the shoulder portion at the shoulder anchor 20 side to the buckle 30 side of the waist portion at the body of the passenger 28. In this way, the body of the passenger 28 who is seated in the seat 14 is restrained by the webbing 18.

On the other hand, when the vehicle suddenly decelerates, the body of the passenger 28 attempts to move inertially toward the vehicle front. The waist portion of the passenger 28 who attempts to move inertially toward the vehicle front pulls the lap webbing 42 of the webbing 18 forward. Further, the chest portion and the abdomen portion of the passenger 28 who attempts to move inertially toward the vehicle front pull the lap webbing 42 of the webbing 18 forward. Due thereto, pulling force toward the longitudinal direction distal end side (the anchor plate 52 side) and pulling force toward the longitudinal direction proximal end side (the shoulder anchor 20 side) act on the webbing 18 with the portion, that is positioned at the inner side of the through-hole 24 (the tongue 22), being the boundary therebetween. The portion of the webbing 18, which portion is positioned within the through-hole 24 of the tongue 22, is pushed by the inner peripheral portion of the through-hole 24 due to the webbing 18 being pulled as described above.

In the applied state of the webbing 18, the dilatant characteristic portion 62 is provided continuously from the lap webbing 42 side toward the shoulder webbing 44 side. Therefore, when the portion of the webbing 18, which portion is positioned within the through-hole 24, is pushed against the inner peripheral portion of the through-hole 24, pushing reaction force, i.e., load, from the inner peripheral portion of the through-hole 24 is received by the dilatant characteristic portion 62 within the webbing 18. Of the dilatant characteristic resin 66 that structures the dilatant characteristic portion 62, the portion that is positioned within the through-hole 24 and the vicinity thereof receive the aforementioned load, and are thereby hardened instantaneously in a substantial U-shape so as to nip, from the both thickness direction sides thereof, the side of the tongue 22 which side is opposite the insert-in portion 26.

Due thereto, it becomes difficult for the portion of the webbing 18, which portion is positioned at the inner side of the through-hole 24, and the portion in the vicinity thereof, to bend. In order for the webbing 18 to pass-through the through-hole 24 of the tongue 22 and move, as shown in FIG. 4, the webbing 18 gradually bends and deforms. However, as described above, it is difficult for the portion of the webbing 18, which portion is positioned at the inner side of the through-hole 24, and the portion in the vicinity thereof, to bend, and therefore, the webbing 18 passing-through the through-hole 24 of the tongue 22 and moving can be prevented or suppressed.

Therefore, the portion of the webbing 18, which portion is at the shoulder webbing 44 side, moving toward the lap webbing 42 side and the lap webbing 42 becoming long can be prevented or suppressed, and the waist portion of the passenger 28 moving toward the vehicle front can be effectively prevented or suppressed by the lap webbing 42 (the waist portion of the passenger 28 can be restrained effectively).

Further, the present embodiment is not a structure in which the tongue 22 locks the webbing 18 when the webbing 18 is pulled by the body of the passenger 28, and further, even if the webbing 18 receives load from the inner peripheral portion of the through-hole 24, the dilatant characteristic resin 66 that has hardened receives this load. Therefore, it is difficult for excessive load to be applied to the webbing 18, and damage to the webbing 18 can be prevented.

Moreover, in the state in which load is not applied, the dilatant characteristic portion 62 is in a liquid form or a gel form, and therefore, the dilatant characteristic portion 62 deforms so as to follow the bending of the webbing 18. Thus, in the state in which load is not applied to the dilatant characteristic resin 66, the dilatant characteristic portion 62 deforms while following the bending of the webbing 18 at the time of passing-through the through-hole 24 of the tongue 22, and the webbing 18 passes relatively smoothly through the through-hole 24 of the tongue 22. Due thereto, even though the dilatant characteristic portion 62 is provided, the applying of the webbing 18 by the passenger 28 and the removing of the webbing 18 can be carried out easily.

Further, the dilatant characteristic portion 62 is a structure in which the dilatant characteristic resin 66 is provided at the inner side of the covering portion 64. Therefore, it can be made difficult for the hardness of the dilatant characteristic resin 66 to be transmitted to the passenger 28 when the waist portion of the passenger 28, who attempts to move inertially toward the vehicle front, pushes the dilatant characteristic resin 66 that has hardened.

Moreover, because the dilatant characteristic portion 62 is provided at the portion of the webbing 18 that becomes the lap webbing 42, the thickness of the lap webbing 42 increases by an amount corresponding to the provision of the dilatant characteristic portion 62. Due to the thickness of the lap webbing 42 increasing in this way, looseness, or so-called "slack", arising in the lap webbing 42 in the state in which the passenger 28 has applied the webbing 18 can be suppressed, and, in this sense as well, the inertial movement of the waist portion of the passenger 28 toward the vehicle front side can be prevented or suppressed.

Further, in the present embodiment, the range of the dilatant characteristic portion 62 is set such that, in the state in which the webbing 18 is applied to the body of the passenger 28, the other end (the end portion at the shoulder anchor 20 side) of the dilatant characteristic portion 62 is positioned in a vicinity of the through-hole 24. Therefore, bulging or the like due to the provision of the dilatant characteristic portion 62 does not arise at the majority of the shoulder webbing 44, and the majority of the shoulder webbing 44 is a simple strip shape. Due thereto, the applied sensation that the passenger 28 feels when the passenger 28 has applied the webbing 18 improves, and the appearance also improves.

Moreover, in the state in which the webbing 18 is applied to the body of the passenger 28, the dilatant characteristic portion 62 does not protrude greatly toward the shoulder webbing 44 side, and therefore, the dilatant characteristic portion 62 does not become unnecessarily long, and the cost thereof as well is inexpensive.

Note that, in the present embodiment, as shown in FIG. 5, the dilatant characteristic portion 62 is provided within the webbing 18 by sewing the periphery of the dilatant characteristic portion 62 at the webbing 18 in the state in which the dilatant characteristic portion 62 is nipped between the portions of the webbing 18 that are further toward the proximal end side and the distal end side of the webbing 18 than the folded-over position at the slit 54. However, the structure of providing the dilatant characteristic portion 62 at the webbing 18 is not limited to such an aspect.

Hereinafter, other aspects for providing the dilatant characteristic portion 62 at the webbing 18 are described briefly on the basis of FIG. 6 through FIG. 8. Note that exploded perspective views of these aspects are shown in the respective drawings of FIG. 6 through FIG. 8, and cross-sectional views in the assembled state (the state in which the dilatant characteristic portion 62 is provided at the webbing 18) are shown within the one-dot chain line circles in the respective drawings.

Figure 6:
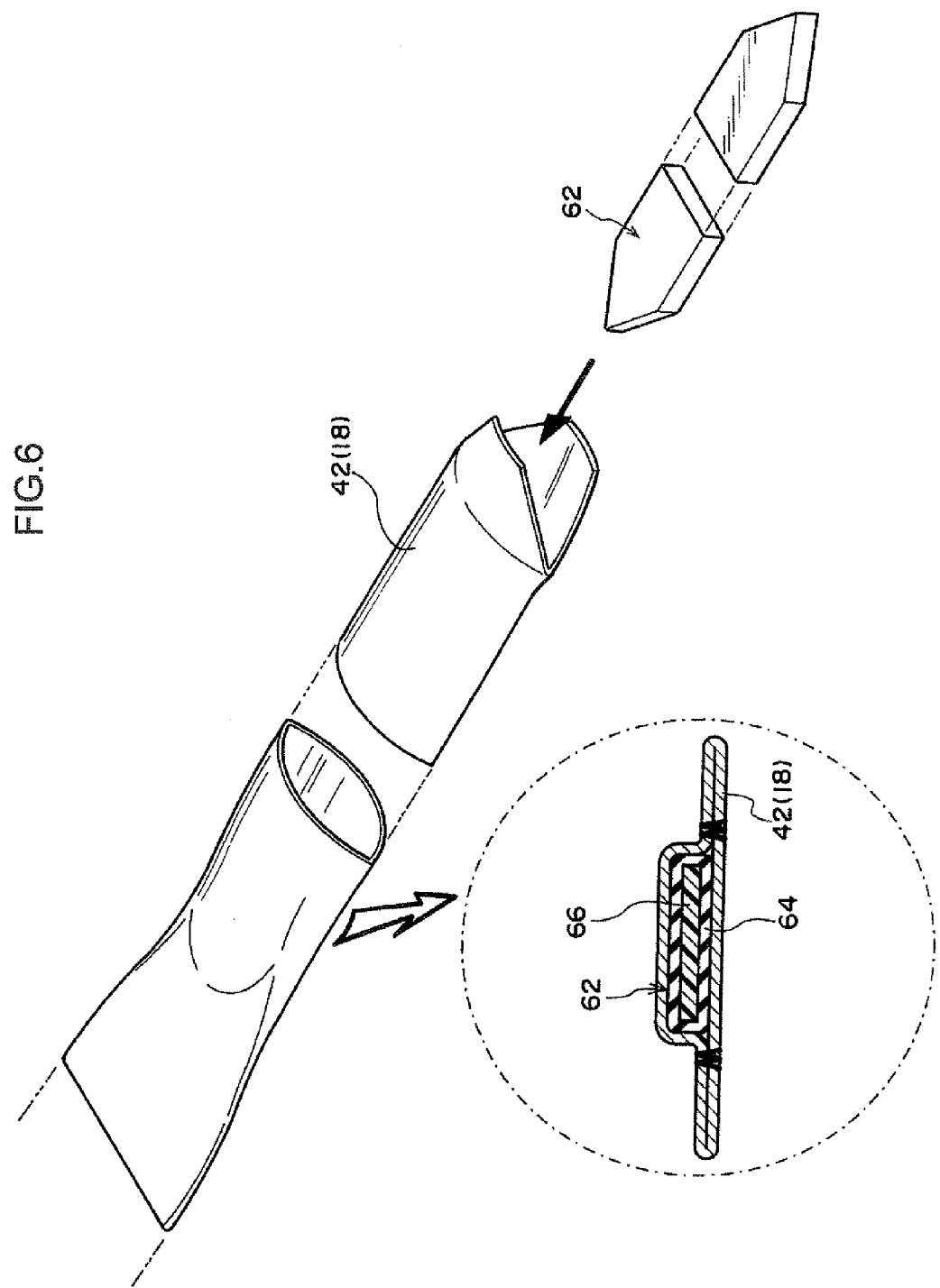
FIG. 6 is an exploded perspective view of the webbing, showing a modified example of a state before the dilatant characteristic portion is provided at the webbing.

For example, as shown in FIG. 6, there may be a structure in which the dilatant characteristic portion 62 is provided within the webbing 18 by, at least in the range in which the dilatant characteristic portion 62 is disposed at the webbing 18, the webbing 18 being formed in a bag shape that is open at the distal end thereof (the portion that is anchored at the anchor plate 52), and the dilatant characteristic portion 62 being inserted into the webbing 18 from the distal end of the webbing 18, and the periphery of the dilatant characteristic portion 62 at the webbing 18 being sewn.

Figure 7:
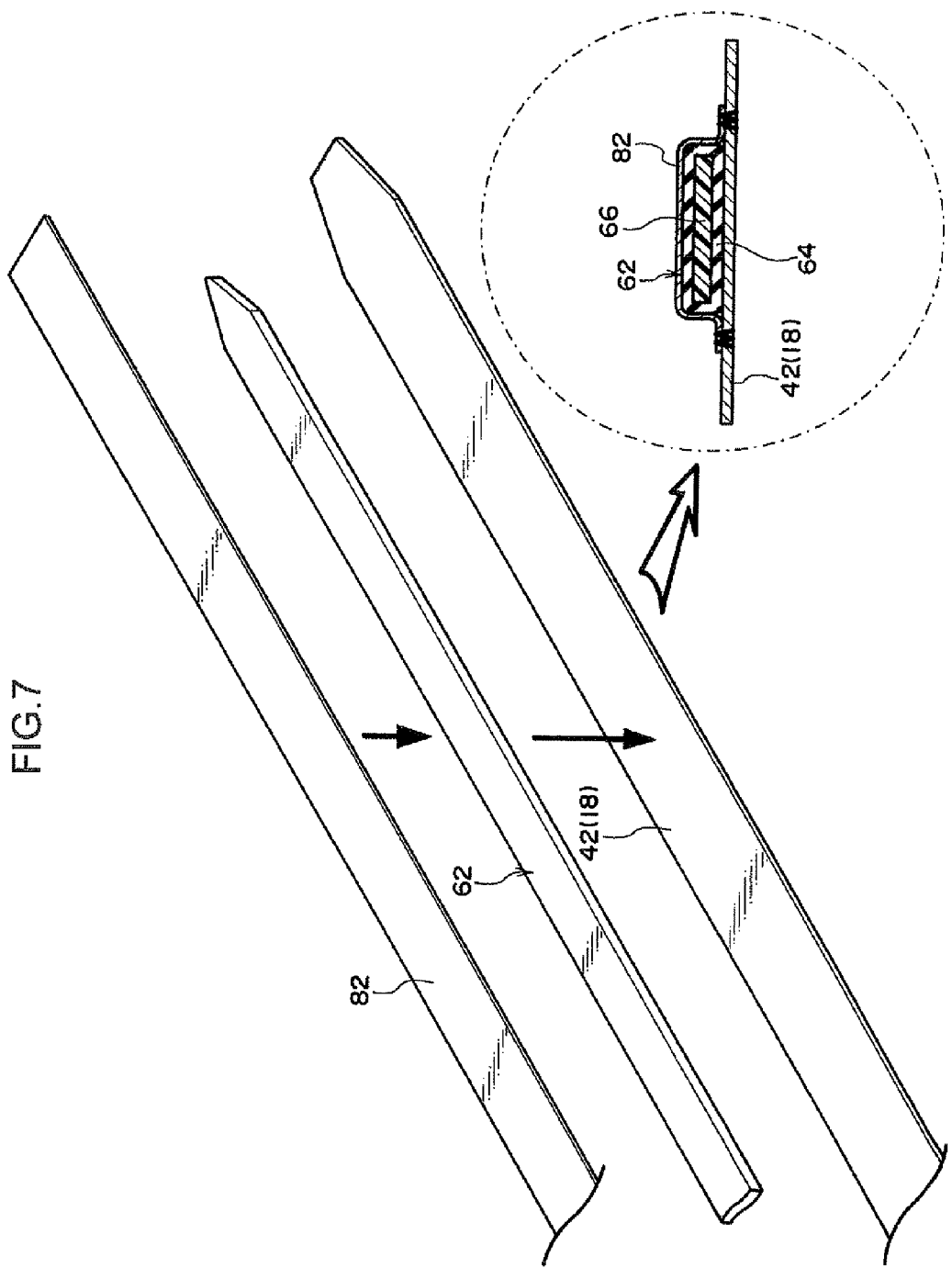
FIG. 7 is an exploded perspective view of the webbing, showing a modified example of a state before the dilatant characteristic portion is provided at the webbing.

Moreover, as shown in FIG. 7, there may be a structure in which the dilatant characteristic portion 62 is provided at the webbing 18 by, in a state in which the dilatant characteristic portion 62 is disposed on the webbing 18, a sheet material 82 that is elongated-strip-shaped and is separate from the webbing 18 being made to cover the dilatant characteristic portion 62, and, in this state, the periphery of the dilatant characteristic portion 62 at the webbing 18 and the sheet material 82 being sewn.

Figure 8:
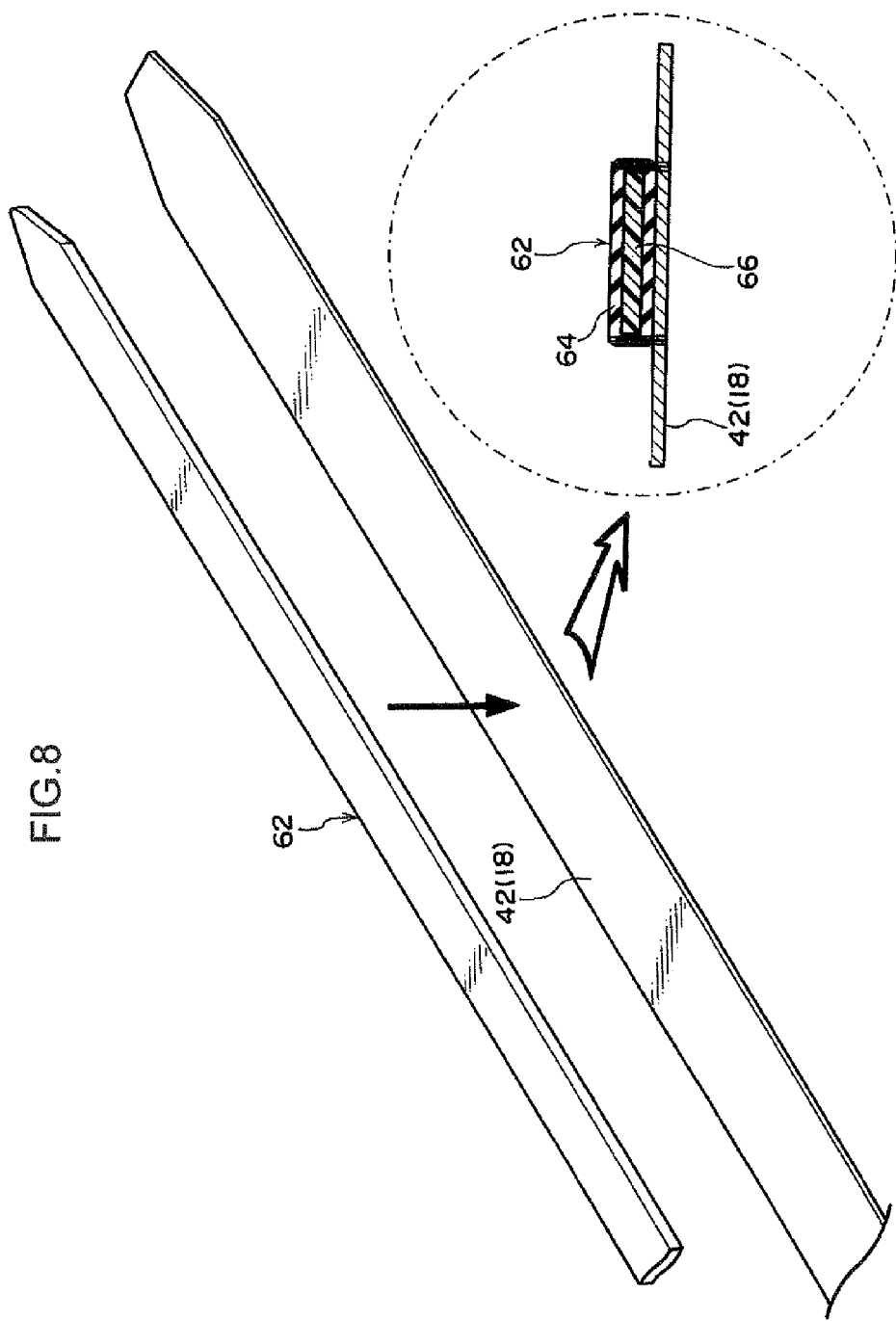
FIG. 8 is an exploded perspective view of the webbing, showing a modified example of a state before the dilatant characteristic portion is provided at the webbing.

Moreover, as shown in FIG. 8, after placing the dilatant characteristic portion 62 on one surface in the thickness direction of the webbing 18, the dilatant characteristic portion 62 and the webbing 18 may be sewn and the dilatant characteristic portion 62 attached integrally to the webbing 18, or, an adhesive may be applied to the surface of the dilatant characteristic portion 62, which surface faces the webbing 18, and the dilatant characteristic portion 62 may be fixed integrally to the webbing 18 by this adhesive.

DESCRIPTION OF THE REFERENCE NUMERALS

- 10 seat belt device
- 18 webbing
- 22 tongue
- 24 through-hole
- 42 lap webbing
- 44 shoulder webbing
- 62 dilatant characteristic portion
- 64 covering portion
- 66 dilatant characteristic resin (dilatant characteristic material)
- 72 cut-out portion

The invention claimed is:

1. A seat belt device comprising:
a webbing having a longitudinal direction intermediate portion; and
a tongue having a through-hole disposed therein, the longitudinal direction intermediate portion passing through the through-hole, and the tongue being movable in a longitudinal direction, wherein
in an applied state to a body of a passenger, the webbing defines a lap webbing that restrains a waist portion of the passenger and a shoulder webbing that restrains a chest portion and a shoulder portion of the passenger, the lap webbing being disposed in a first longitudinal direction from the through-hole, and the shoulder webbing being disposed in a second longitudinal direction from the through-hole,
the seat belt device further comprising a dilatant characteristic portion that includes a material having a dilatant characteristic of hardening due to a load of a predetermined magnitude or greater, and that is provided at a region of the webbing that includes a portion of the webbing that is positioned inside the through-hole in the applied state.

2. The seat belt device of claim 1, wherein, in the applied state, the dilatant characteristic portion is provided to a region of the webbing that is further toward the lap webbing side with respect to the through-hole.

3. The seat belt device of claim 2, wherein, in the applied state, the dilatant characteristic portion is provided at a region of the webbing that extends toward the shoulder webbing side with respect to through-hole, and to a portion in a vicinity of the through-hole.

4. The seat belt device of claim 1, wherein, when the webbing is folded-over at one end of the webbing, and the dilatant characteristic portion is disposed between a first portion of the webbing that is further toward first longitudinal direction than the folded-over position and a second portion of the webbing that is further toward the second longitudinal direction than the folded-over position, the first portion of the webbing and the second portion of the webbing are superposed, and a periphery of the dilatant characteristic portion at the webbing is sewn.

5. The seat belt device of claim 1, wherein the webbing is formed in a bag shape that is open at one end, and, when the dilatant characteristic portion is inserted into an inside of the webbing from the open end, a periphery of the dilatant characteristic portion at the webbing is sewn.

6. The seat belt device of claim 1, wherein the dilatant characteristic portion is integrally attached to one surface of the webbing in a thickness direction.

7. The seat belt device of claim 1, wherein
a transverse dimension of the dilatant characteristic portion along a transverse direction of the webbing is set to be shorter than a transverse dimension of the webbing,
the dilatant characteristic portion is provided at one side of the webbing in a thickness direction,
the tongue includes a cut-out portion disposed on a surface of the through-hole, and
the dilatant characteristic portion passes through the through hole along an inner surface of the cut-out portion.

8. The seat belt device of claim 1, wherein
the dilatant characteristic portion is formed by a dilatant material that has a dilatant characteristic of hardening by receiving a load, and
a covering portion that is more flexible than a main dilatant characteristic portion in a hardened state.

9. The seat belt device of claim 1, wherein the dilatant characteristic portion includes a taper shape, at which a transverse dimension of the dilatant characteristic portion along a transverse direction of the webbing gradually becomes shorter, wherein
the taper shape is formed from an intermediate portion of the dilatant characteristic portion along a longitudinal direction of the webbing, toward at least one of the first and second longitudinal directions,
the tongue includes a cut-out portion disposed on a surface of the through-hole, and
the webbing with the dilatant characteristic portion that increases a thickness dimension of the webbing passes through the through hole along an inner surface of the cut-out portion.

* * * * *